VERNON H. JUNGJOHANN
JOHN D. HAGIN
INVENTORS

BY Raymond L. Owens
Robert W. Hampton
ATTORNEYS

VERNON H. JUNGJOHANN
JOHN D. HAGIN
INVENTORS

ATTORNEYS

United States Patent Office 3,664,736
Patented May 23, 1972

3,664,736
SINGLE-FRAME FILM APPARATUS
Vernon H. Jungjohann and John D. Hagin, Rochester, N.Y., assignors to Eastman Kodak Company, Rochester, N.Y.
Filed May 18, 1970, Ser. No. 38,086
Int. Cl. G03b 17/46, 21/38
U.S. Cl. 352—84
8 Claims

ABSTRACT OF THE DISCLOSURE

Remote controlled apparatus for exposing film frames includes a camera having shutter and film pull-down mechanisms, a single-frame mechanism driven by a drive motor, and a timing circuit adapted to be placed into operation by a remotely produced signal which thereafter periodically energizes and de-energizes the drive motor. The single-frame mechanism provides for uniform exposure of successive film frames, regardless of drive motor speed. More particularly, the single-frame mechanism includes a first rotatable member which is directly driven by the motor and is adapted to wind a spring. The spring engages a latched second rotatable member which is released when the first member has wound the spring to where it has a predetermined stored energy. Thereafter, the spring rotates the second member which, in turn, drives the shutter during film exposure. After a film frame is exposed, there is a positive drive connection between first and second members which may come into play, thereby permitting the motor to directly drive the film pull-down mechanism.

BACKGROUND OF THE INVENTION

Field of the invention

The present invention relates to motion picture apparatus for advancing and exposing film one frame at a time, and which provides uniform exposure conditions for successive film frames.

Description of the prior art

Although it is not limited thereto, the present invention is especially suitable for use in surveillance apparatus for intermittently exposing film to incident light from a scene under surveillance. It is also suitable for use in time elapsed photography. In such applications there may be a considerable time delay, say for example, from 1.25 to 90 seconds between film exposures. This time delay is ordinarily adjustable. A number of motor driven mechanisms have been previously devised for advancing motion picture film a single frame at a time. In one arrangement, the motor is constantly driven and is connected to the pull-down and shutter mechanisms by means of a clutch-type arrangement, which when engaged permits the motor to maneuver the shutter mechanisms through a film exposure cycle and then cause the pull-down mechanism to advance the film one frame. However with this arrangement variation in the motor speed results in variation of the exposure conditions for successive film frames.

SUMMARY OF THE INVENTION

An object of the invention is to provide improved remote controlled motion picture apparatus.
A further object of the present invention is to provide a single-frame movie camera mechanism providing constant film exposure conditions from frame to frame notwithstanding variations in camera motor speed.
In the disclosed embodiment of the invention there is provided an apparatus which includes a camera and means adapted to be activated by remote control to periodically energize and de-energize a motor within the camera. The motor drives a single-frame mechanism connected to shutter and film advancing mechanisms. The single-frame mechanism is provided with a first rotatable member and a second rotatable member normally held in a latched condition. Both members are connected to a spring member which, when the second member is held, is wound by rotation of the first member so as to store energy. After a predetermined amount of energy is stored, a cam member on the first member releases a latch lever which permits the spring to rotate the second member to drive a shutter mechanism through an exposure cycle. If there is sufficient force in the spring, then the spring will drive the pull-down mechanism and cause the latch lever to re-engage the second member. However, if the spring force is not sufficient to operate the pull-down mechanism then a lug on the first member engages a lug on the second member permitting the motor to positively drive the second member so that the pull-down mechanism can move the film to the next frame. This is an important feature of the present invention inasmuch as the shutter mechanism will be driven with a constant exposure condition frame by frame.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Because certain parts of photographic and related apparatus are well known, the following description is directed in particular to those elements forming, or cooperating directly with apparatus in accordance with the present invention, elements that are not specifically shown or described herein being selectable from those known in the art.

Figure 1:
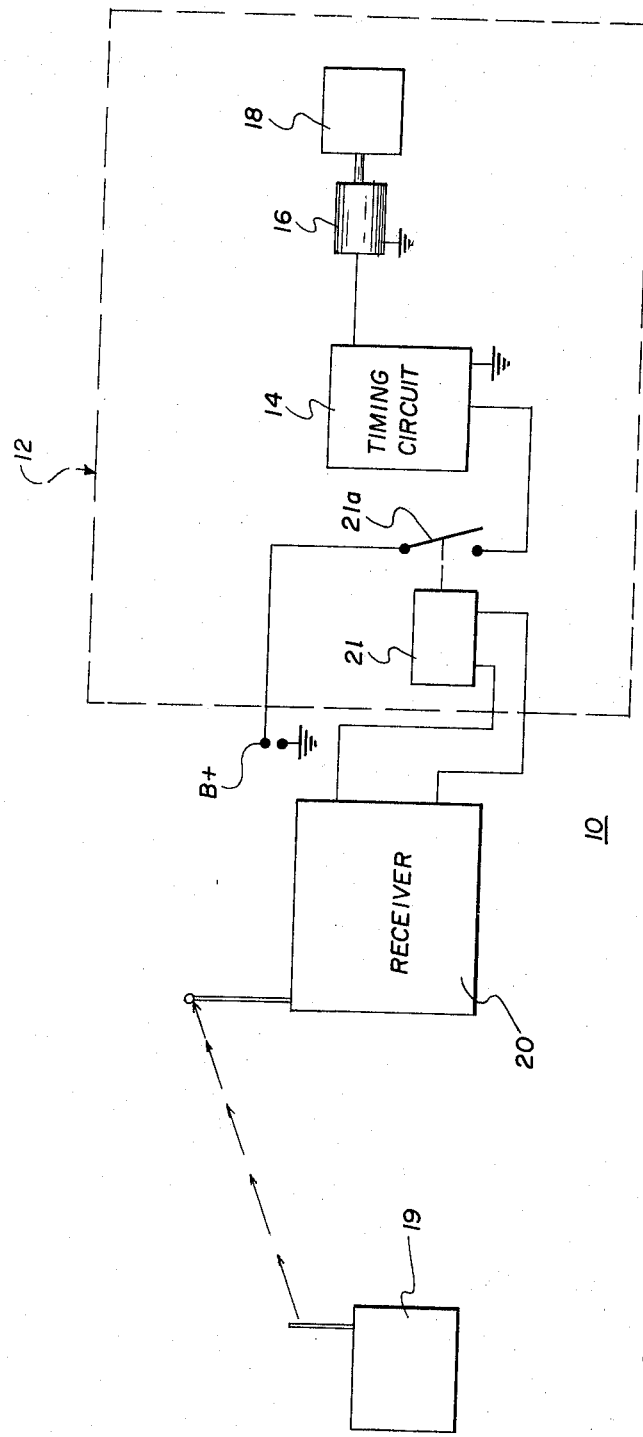
FIG. 1 is a schematic diagram of a remotely controlled apparatus in accordance with the invention.

FIG. 1 shows an exemplary remote controlled apparatus 10. Embodied within the apparatus 10 are a single-frame camera 12 which has a timing circuit 14, a drive motor 16 connected to the circuit 14, a single-frame mechanism 18 described more fully in connection with FIG. 2, and electronically controlled circuitry for applying an operating potential to the timing circuit 14. The timing circuit 14 is operative to periodically energize and then de-energize the drive motor 16. Although the timing circuit 14 may take various forms known in the art, the circuit disclosed in commonly assigned co-pending U.S. patent application Ser. No. 38,089, entitled Motor Timing Circuit, filed May 18, 1970, in the name of Oran T. Casebeer, is especially suitable for use with the apparatus 10.

The electronically controlled circuitry includes a press to actuate transmitter 19, which emits a signal in the radio frequency (RF) band. A receiver 20 spaced some distance from the transmitter 19, is adapted to receive the RF signal, amplify the RF signal and cause a relay 21 to be energized. The relay 21 closes a set of contacts 21a to apply a B+ voltage to the timing circuit 14. The transmitter 19 and receiver 20 also may take various forms known in the art some of which are commercially available as remote controlled garage door openers.

Figure 2:
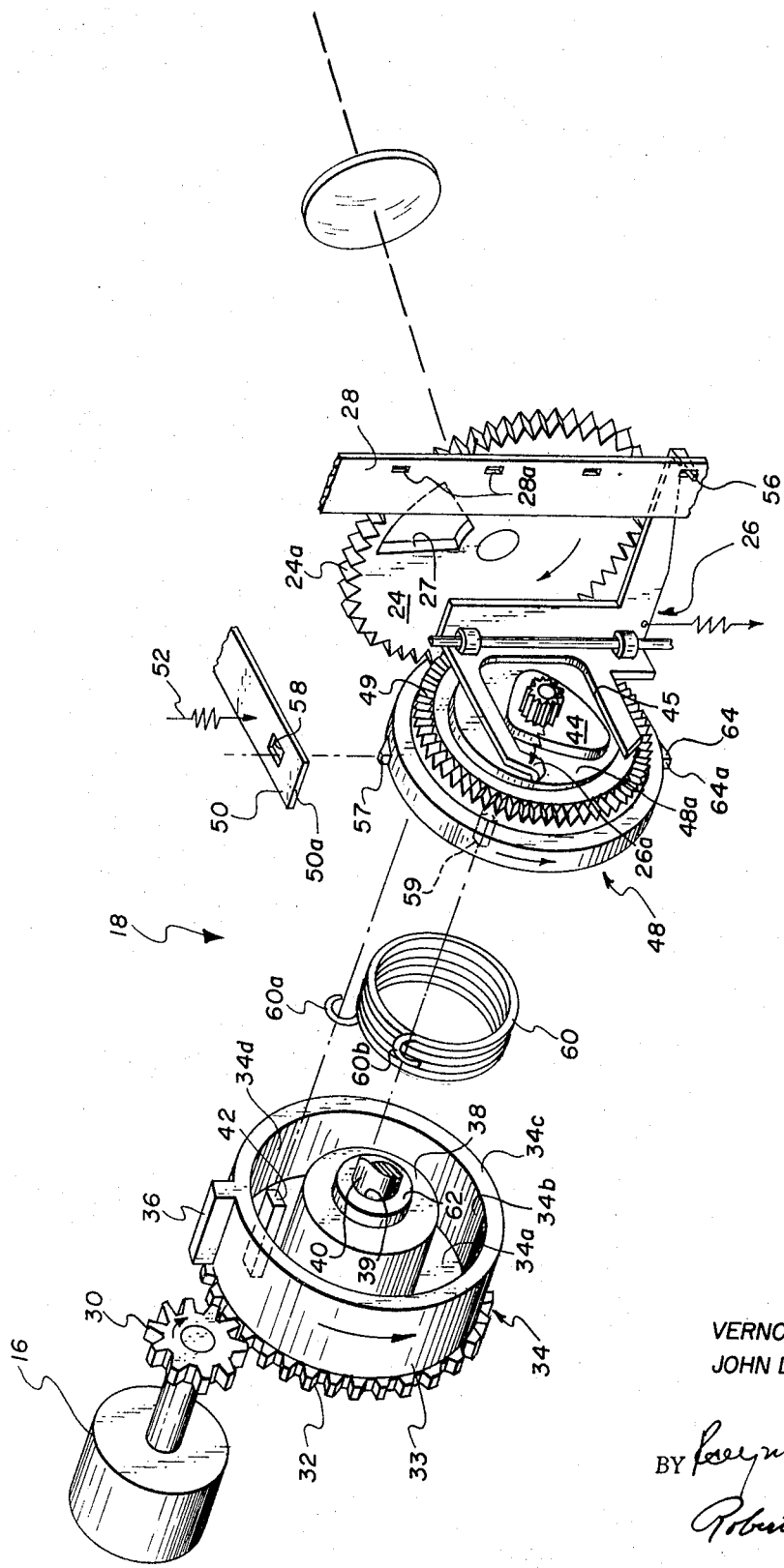
FIG. 2 is an exploded, diagrammatic illustration of a single-frame mechanism embodied within the apparatus shown in FIG. 1 and having certain parts broken away for clarity of illustration.

Turning now to FIG. 2, the single-frame mechanism 18 is shown interposed between the drive motor 16 and a rotatable shutter 24 and a film pull-down mechanism 26. As will later be described, the mechanism 18 drives the shutter mechanism 24 with a variable velocity so that the shutter window 27 will pass by a frame of film 28 to be exposed with a uniform exposure condition from frame by frame and then drives the pull-down mechanism 26 to advance the film 28 so that the next frame is in a position whereby it may be exposed by the shutter 24. In the disclosed embodiment, the shutter is rotatably mounted and when the term velocity is used it is with reference to angular velocity. However, a shutter which uses rectilinear motion can be used in accordance with the invention. Hence the term velocity will be understood to comprehend either angular or rectilinear motion depending upon the type of shutter selected to practice with the invention. In view of the fact that conventional shutter and pull-down mechanisms may be utilized in accordance with the invention, their descriptions will be limited inasmuch as they are well understood to those skilled in the art.

The motor 16 is coupled to a gear 30 which meshes with a gear 32 disposed on one extreme end of the exterior peripheral surface 33 of a generally cylindrical rotatable member 34. Actually the member 34 is cup-shaped and configured so as to define an interior end wall 34a which merges into cylindrical portion 34b which extends outwardly to a free end surface 34c (opposite from the gear 30) and thereby defines a receiving chamber 34d. On the outer surface 33, extending from the gear 32 to the surface 34c, a raised or camming surface portion 36 is provided. Integral with the interior wall 34a is a cylindrical portion 38 which projects outwardly from the main portion of the wall 34a and is formed with an axially aligned bearing surface 39 which permits the member 34 to be rotatably mounted upon a shaft 40. Also formed on the interior surface of the wall 34a is a positive drive lug 42, the function of which will be described hereinafter.

A second disc-shaped rotatable member 48 is adapted to slidably engage a bearing surface of a spacer member 62 which is fixedly secured to the shaft 40. The spacer also engages the flat surface of the portion 38 and is of a thickness which prevents the free end 34c of the member 34 from engaging the member 48. Preferably, the spacer 62 is made of a material having a low coefficient of friction. At the extreme end of the shaft 40, where it projects through the member 48, there is secured an "up and down" cam 44 which drives a follower 45 of the film pull-down mechanism 26 to position a film engaging claw 56 of the mechanism "up and down" relative to the film. Returning to the member 48, its exterior surface 48a defines an "in and out" cam which also engages the follower 26a of the pull-down mechanism 26 so as to reciprocate the claw 56 "in and out" relative to the film. There is a spring (not shown) which urges the follower 26a into constant engagement with the axial cam surface 48a and this force also functions to hold the members 34 and 48 in a co-operating relationship whereby both members engaged with space 62. The in and out and up and down cams cooperate in a manner well known in the art to actuate the film claw 56 through a film pull-down cycle during which the claw engages a film perforation to advance the framed film. The member 48 is also provided with a gear 49 which engages a gear 24a formed on the periphery of the shutter 24 to drive the shutter 24.

Means are provided for actuating the member 48 to advance and expose a film frame. This means includes a lever 50 urged by a spring 52 toward a latching position wherein a lug 57 formed in the exterior rim of the disc member 48 is received by a hole 58. Alternatively, the lever 50 may be made of a resilient material and disposed so that it will provide its own spring force. In this position of the lever 50 the second member 48 is prevented from rotating.

Coiled about the outer surface of the cylindrical portion 38 within the chamber 34d is a helical spring 60, having two hooked-shaped ends 60a and 60b which are, respectively, secured to the lug 42 of the first member 34 and a lug 59 formed in the interior surface of the second member 48. Any other appropriate means could be provided to secure the ends of the spring 60 to the members 34 and 48.

In operation, when the motor 16 is energized, it drives the gear 30 which in turn causes the first member 34 to rotate in a counterclockwise direction about the axis of the shaft 40 and thereby causes the spring 60 to wind up and coil more tightly about the cylindrical portion 38. The reason for this is that at this time the latching lever 50 is in engagement with the lug 57 and prevents the member 48 from rotating. When the spring 60 has a predetermined amount of energy stored in it, the cam surface 36 will be rotated into position whereby it engages and lifts the lever 50 to a position wherein the lug 57 is free of the hole 58. At this time the member 48 is free to rotate and the spring 60 will drive the member 48 in a counterclockwise direction. This driving force will cause the member 24 to be driven in a clockwise manner and during this driving cycle the exposure window 27 will pass by the film 28 and expose a film frame. Thereafter there is a tendency for the spring 60 to oscillate. However, at this time a lug 64 will have already been rotated to a position whereby if the spring 60 tends to drive the member 48 in a clockwise direction, the front face 64a will after executing some movement run into an abutting relationship with the lead edge 50a of the lever 50 thereby preventing further clockwise movement. Now if there is sufficient force in the spring 60, the spring will drive the pull-down mechanism 26, advancing the next film frame and causing the lever 50 to re-engage the lug 57.

It should be noted that the lug 42 of the member 34 and the lug 59 of the member 48 are spaced the same axial distance from the axis of the shaft 40. The lugs 42 and 59 only engage if the spring 60 did not leave enough force to operate the pull-down mechanism 26 to advance the film frame. Only in such a situation will the lug 42 run into a positive engagement with the lug 59. At this point in the cycle, the motor 16 will now be in a positive driving relationship with the member 48 and the pull-down mechanism 26. Also, at this point in the cycle the pull-down mechanism 26 begins its operation and commences to insert the claw 56 into the film perforation 28a and then pull-down the film 28 so that the next frame will be in a position whereby it may be exposed. As the pull-down operation proceeds, the motor 16 positively drives the mechanism 26 until the position is reached whereby the lug 57 is re-inserted into the receiving hole 58 of the lever 50. At this time, the member 48 will stop rotating and the pull-down mechanism 26 will have completed its operation. Shortly thereafter the motor 16 will have completed its operation. Shortly thereafter the motor 16 will be de-energized and the mechanism 18 will again await the energization of the motor 16 which will repeat the cycle.

The invention has been described in detail with particular reference to the preferred embodiment thereof, but it will be understood that variations and modifications can be effected within the spirit and scope of the invention.

We claim:

1. In a camera for exposing a film frame by frame and including a motor, shutter means and film advancing means; the improvement comprising single-frame mechanism means connected to said motor and said advancing and shutter means including energy storage means driven by said motor and adapted to store a predetermined amount of energy and thereafter use said stored energy to drive said shutter means with uniform film exposure from frame to frame, and means operative after said film frame exposure for providing a positive drive connection between said motor and said advancing means.

2. The invention as set forth in claim 1 wherein said single-frame mechanism means includes:
   (a) first rotatable means adapted to be driven by said motor;
   (b) second rotatable means for driving said shutter means and said film advancing means;
   (c) restraining means having a first position for restraining said second member and a second position for permitting said second member to rotate;
   (d) said energy storage means being secured to said first and second rotatable means and adapted to store energy when said first means is driven by said motor and said second means is restrained by said restraining means; and
   (e) cam means driven by said motor and adapted to release said restraining means after said energy storage means has stored a predetermined amount of energy and to apply said energy to said second rotatable means, whereby said second rotatable means will drive said shutter means to expose a frame of film.

3. The invention as set forth in claim 1 including timing circuit means which when actuated sequentially energizes and de-energizes said motor.

4. The invention as set forth in claim 3 including means for actuating said timing circuit comprising transmitter means for producing an RF signal and receiver means spatially separated from said receiver means and in response to said RF signal for actuating said timing circuit means.

5. In a camera for exposing a film frame by frame and including a motor, shutter means and film advancing means; the improvement comprising single-frame mechanism means connected to said motor, said film advancing means and said shutter means including energy storage means driven by said motor and adapted to store a predetermined amount of energy and thereafter use said energy to drive said shutter means with a constant film exposure to expose a film frame, means operative after exposure of a film frame for providing a positive drive connection between said motor and said advancing means, and means responsive to a remote controlled signal for sequentially energizing and de-energizing said motor.

6. In a camera adapted to receive a strip of film and having actuable shutter means for exposing a frame of film when actuated, and means effective for advancing the film strip by one frame of film, the combination comprising:
   (a) drive means;
   (b) shutter actuating means adapted to be movable along a path for actuating the shutter means and causing the shutter means to expose a frame of film;
   (c) restraining means movable between a first position wherein it is effective for restraining said shutter actuating means against movement along the predetermined path and a second position wherein it is effective for permitting said shutter actuating means to move along the predetermined path;
   (d) energy storage means coupled to said drive means and to the shutter actuating means, the energy storage means being effective in a first condition in response to said restraining means being in said first position to receive and store energy from the drive means and being effective in a second condition in response to said restraining means being in said second position to apply stored energy to said shutter actuating means, thereby to cause said shutter actuating means to move along its path;
   (e) release means operative to move said restraining means to said second position after said energy storage means has stored energy, thereby causing said energy storage means to be in said second condition and to apply such stored energy to said shutter actuating means so that said shutter actuating means moves along its path and actuates the shutter means to cause the exposure of a frame of film, whereby the shutter means effects a substantially uniform exposure condition from frame to frame; and
   (f) coupling means operative after the shutter means has been actuated to couple said drive means to the film advancing means to cause the film advancing means to advance a frame of film.

7. The invention as set forth in claim 6 wherein said drive means includes a first rotatable member and said release means includes camming means formed on said first rotatable member and adapted periodically to engage said restraining means, said shutter actuating means includes a second rotatable member and said energy storage means includes a spring coupled to said first and second members.

8. The invention as set forth in claim 7 wherein said coupling means includes a first lug mounted on said first rotatable member and a second lug mounted on said second member, said first and second lugs being positioned on said members so that they engage after the shutter means has exposed a frame of film.

References Cited

UNITED STATES PATENTS

| | | | |
|---|---|---|---|
| 3,008,371 | 11/1961 | Brault et al. | 185—40 R X |
| 2,350,355 | 6/1944 | Hoffmann | 185—40 R X |
| 2,353,154 | 7/1944 | Fowler | 352—84 X |
| 2,966,093 | 12/1960 | Applegate | 352—84 |
| 2,986,067 | 5/1961 | Göpfert et al. | 352—169 |
| 3,122,076 | 2/1964 | Hefley et al. | 352—84 UX |

LOUIS R. PRICE, Primary Examiner

J. W. ROSKOS, Assistant Examiner

U.S. Cl. X.R.

185—40 R; 226—62, 169; 352—169